L. A. YOUNG.
WHEEL.
APPLICATION FILED FEB. 11, 1915.
1,156,124.
Patented Oct. 12, 1915.
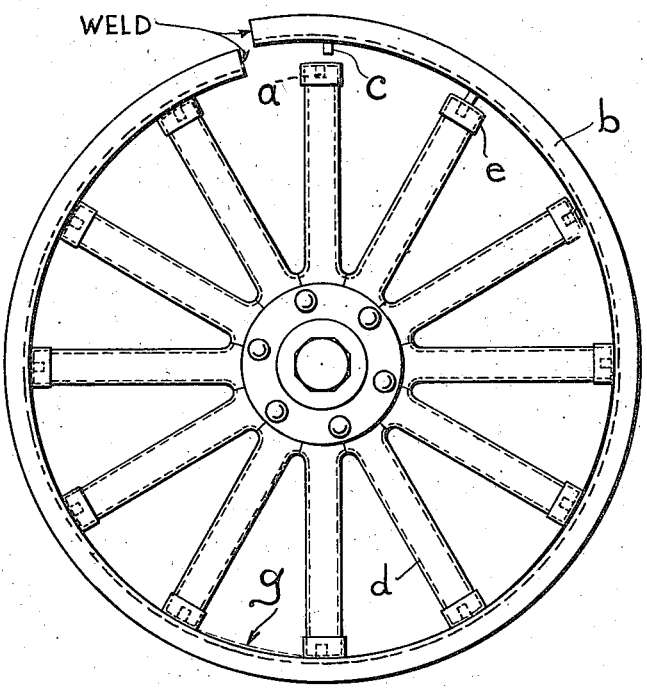
Fig. 1
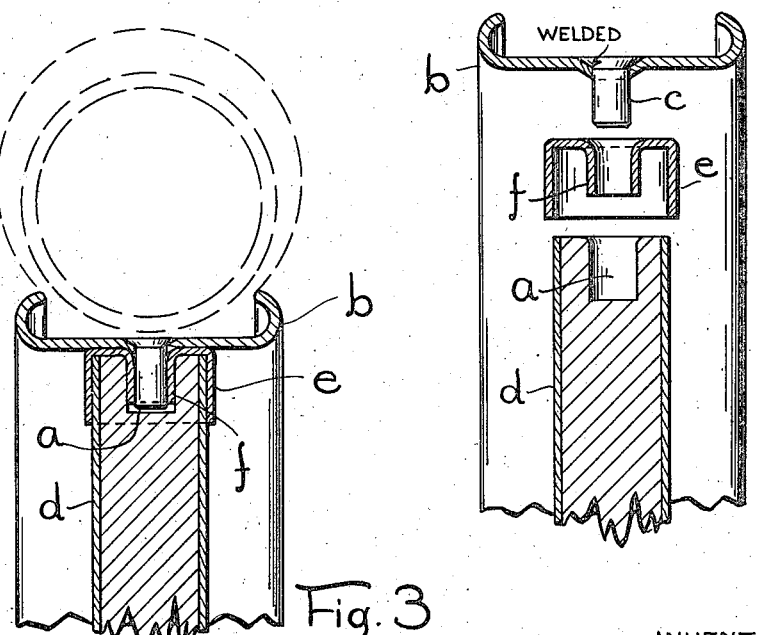
Fig. 2
Fig. 3
WITNESSES
INVENTOR
Leonard A. Young
BY
Raymond A. Parker
ATTORNEY

UNITED STATES PATENT OFFICE.

LEONARD A. YOUNG, OF HIGHLAND PARK, MICHIGAN.

WHEEL.

1,156,124.  Specification of Letters Patent.  Patented Oct. 12, 1915.

Application filed February 11, 1915. Serial No. 7,579.

*To all whom it may concern:*

Be it known that I, LEONARD A. YOUNG, a citizen of the United States, residing at Highland Park, county of Wayne, State of Michigan, have invented a certain new and useful Improvement in Wheels, and declare the following to be a full, clear, and exact description of the same, such as will enable others skilled in the art to which it pertains to make and use the same, reference being had to the accompanying drawings, which form a part of this specification.

This invention relates to vehicle wheels and especially to automobile wheels of a composite wood and metal structure whereby most of the advantages of a wire wheel are secured without many of its disadvantages.

The nature of the improvement will fully appear hereinafter.

In the drawings,—Figure 1 is a side view of a wheel in the process of completion. Fig. 2 is a detail in section showing the manner in which a spoke is secured to the rim. Fig. 3 is a detail showing the parts of Fig. 2 in their relative positions when the fastening has been completed.

The wheel that I have chosen as illustrating my invention is the well known automobile wheel of the artillery type except that no wooden felly is used. However, I do not limit myself to a wheel of the artillery type as it is apparent that my invention resides in the type of rim employed and the devices used to connect the ends of the spokes to the rim.

The end of each spoke is drilled to form a mortise $a$. The rim, before final attachment, is in reality a channeled split ring $b$. However, I do not limit myself to any particular kind of rim other than a metal rim, as it is apparent that it makes no particular difference how the rim seats the tire. The rim is perforated so as to provide one perforation for each spoke. The metal circumjacent the perforation is pressed inward to form a countersink to receive the head of a stud $c$ so that when the stud is in place, the top of the head and the inside of the rim are flush. The stud is preferably fastened to the rim by welding so that it thereupon becomes a tenon. It is apparent, however, that other means of fastening the stud to the rim can be employed without departing from my invention.

The spokes are preferably insheathed by a metal covering $d$ which I have fully explained and claimed in a previous patent. A thimble $e$ is fitted over each spoke end and also over the sheathing $d$ when this is used. This thimble is preferably provided with a turned-in sleeve portion $f$ which fits tightly into the mortise $a$ and serves as a protection to prevent moisture getting to the wood so that it rots it or otherwise injures it.

Reference to Fig. 2 clearly indicates how the parts go together to unite the spoke end to the rim, and an examination of Fig. 1 will show how the wheel is completed. When all the tenons have been fitted into the mortises, the rim is practically a true circle and its two ends meet, whereupon these may be welded or otherwise fastened together to make the rim endless and complete. When the two ends of the split rim are fastened together, it is readily understood that the tenons are securely held in the mortises so as to lock the spokes and the rim together. However, the thimble may be welded to the sheathing $d$ and the rim $b$ to even more securely lock the spokes to the rim, if this is desired.

From the above description, it is apparent that I do away with the wooden felly as usually used, and that I get a certain amount of resilience in the rim itself by using substantially solid spoke members bridged by a thin metal rim without a wooden felly. This give or yield is indicated by the arrow at $g$, Fig. 1. This I consider of importance as any yield, no matter how small, is very serviceable to soften the shocks to a wheel and it is advantageous to have it come on the rim rather than on the spoke structure as it does in a wire wheel. Further, it is to be noted that the studs welded to the rim form solid metal tenons and prove a great improvement over the old form of structure of using wooden tenons on the spoke ends which engage in mortises in a wooden felly, for the stresses received by a wheel very easily shear these off.

What I claim is:

1. In a wheel, the combination of a metal rim having perforations with the circumjacent metal forced inward to form a countersink for each perforation, headed studs secured in the perforations and the countersunk metal so as to have the tops of their heads flush with the inner surface of the rim, and a plurality of spokes having mortised ends, said studs being arranged to fit in the mortises of the spoke ends to tie the spokes and rim together.

2. In a wheel, the combination of a metal rim provided with inwardly projecting integral tenons, a plurality of spokes having mortises in their ends, a thimble fitting over the end of each spoke and having a sleeve portion that fits into the mortises to line the same, the said tenons being arranged to fit into the mortises with the sleeve portion of the thimble, substantially as described.

3. A composite wheel, having in combination, a flexible metal rim free of any member that serves as a felly, having inwardly projecting integral tenons, a plurality of wooden spokes secured to the rim by interlocking with said integral tenons, and metal sheathings for the spokes completely insheathing the spokes, substantially as described.

4. A composite wheel, having in combination, a flexible metal rim free of any rigid member that serves as a felly, the said rim being provided with inwardly projecting integral metal tenons, and a plurality of wooden spokes having mortises in their ends, the said spokes being secured to the metal rim by the tenons engaging in the ends of the spokes.

In testimony whereof, I sign this specification in the presence of two witnesses.

LEONARD A. YOUNG.

Witnesses:
STUART C. BARNES,
VIRGINIA C. SPRATT.